(12) United States Patent
Zhang et al.

(10) Patent No.: US 9,480,104 B2
(45) Date of Patent: Oct. 25, 2016

(54) SYSTEMS AND METHODS FOR GENERATING PREAMBLE SYMBOLS IN COMMUNICATION SYSTEMS

(71) Applicant: Marvell World Trade Ltd., St. Michael (BB)

(72) Inventors: Hongyuan Zhang, Fremont, CA (US); Sudhir Srinivasa, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 142 days.

(21) Appl. No.: 13/753,752

(22) Filed: Jan. 30, 2013

(65) Prior Publication Data

US 2013/0195092 A1    Aug. 1, 2013

Related U.S. Application Data

(60) Provisional application No. 61/592,432, filed on Jan. 30, 2012.

(51) Int. Cl.
*H04L 27/26* (2006.01)
*H04W 84/12* (2009.01)
*H04L 5/00* (2006.01)

(52) U.S. Cl.
CPC ............ *H04W 84/12* (2013.01); *H04L 5/0048* (2013.01); *H04L 5/0053* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 7,417,945 B2 * | 8/2008 | Dey | H04L 27/2613 370/208 |
| 2006/0251183 A1 * | 11/2006 | Soffer | H04B 7/10 375/267 |
| 2010/0061402 A1 * | 3/2010 | van Zelst | H04L 5/0023 370/474 |
| 2010/0284393 A1 * | 11/2010 | Abraham | H04L 5/0023 370/343 |
| 2011/0051705 A1 | 3/2011 | Jones, IV et al. | |
| 2011/0051747 A1 * | 3/2011 | Schmidl | H04L 27/2613 370/474 |
| 2011/0096796 A1 | 4/2011 | Zhang et al. | |
| 2012/0263211 A1 * | 10/2012 | Porat | H04L 5/0044 375/219 |

FOREIGN PATENT DOCUMENTS

WO   WO 2010/129239   11/2010

* cited by examiner

*Primary Examiner* — Hassan Phillips
*Assistant Examiner* — Ayanah George

(57) ABSTRACT

A method for transmitting an 802.11ah packet is provided. A training field sequence is generated using control circuitry. A preamble for a packet is generated using the control circuitry. The preamble includes a training field symbol which includes the training field sequence. A portion of the training field sequence is within a plurality of guard tones of the training field symbol. The preamble is transmitted using transmit circuitry.

16 Claims, 7 Drawing Sheets

Predefined LTF Training Sequences

602 — $LTF_{left} = \{ 1, 1, -1, -1, -1, 1, 1, -1, 1, -1, 1, 1, 1, 1, 1, 1, -1, -1, 1, 1, -1, 1, -1, 1, 1, 1, 1 \}$ 604 — $LTF_{right} = \{ 1, -1, -1, 1, 1, -1, 1, -1, 1, -1, -1, -1, -1, -1, 1, 1, -1, -1, 1, -1, 1, -1, 1, 1, 1, 1 \}$

LTF Sequences based on 802.11ac

606 — $2MHz\ LTF_{-28, 28} = \{ 1, 1, LTF_{left}, 0, LTF_{right}, -1, -1 \}$

608 — $4MHz\ LTF_{-58, 58} = \{ LTF_{left}, 1, -1, -1, 1, 1, 0, 0, 0, -1, 1, 1, -1, LTF_{left}, 1, LTF_{right} \}$

Proposed Example LTF Sequence for 4MHz

610 — $4MHz\ LTF1_{-60, 60} = \{ 1, 1, LTF_{left}, 1, LTF_{right}, -1, -1, -1, 1, 1, 0, 0, 0, -1, 1, 1, 1, LTF_{left}, 1, LTF_{right}, -1, -1 \}$ 606 — 2MHz LTF Sequence    606 — 2MHz LTF Sequence

FIG. 6

SYSTEMS AND METHODS FOR GENERATING PREAMBLE SYMBOLS IN COMMUNICATION SYSTEMS

CROSS-REFERENCE TO RELATED APPLICATION

This application claims the benefit under 35 U.S.C. §119 (e) of U.S. Provisional Application No. 61/592,432, filed Jan. 30, 2012, which is hereby incorporated by reference herein in its entirety.

FIELD OF USE

The present disclosure relates generally to communication systems and methods, and more particularly, to systems and methods for generating preamble symbols in communication systems.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The 802.11ah standard allows for wireless local access network (WLAN) ranges beyond what is provided by previous wireless standards. This is achieved by operating at sub 1-GHz bands with lower signal bandwidths.

In designing the 802.11ah standard, similar configuration parameters from previous wireless standards were used. This allows hardware manufactures to develop wireless devices which support not only the 802.11ah standard, but also previous wireless standards with similar hardware.

For example, similar long training field (LTF) parameters in the preamble symbols from the 802.11ac standard have been proposed in the 802.11ah standard. However, the chosen configuration parameters may cause issues in wireless devices when decoding packets at different signal bandwidths supporting the 802.11ah standard. For example, in certain situations, the LTF symbol within the preamble may not provide enough information to generate channel estimations for all tones in a wireless packet—such would prevent a receiver from decoding the wireless packet.

SUMMARY OF THE DISCLOSURE

In accordance with an embodiment, a method for transmitting an 802.11ah packet is provided. A training field sequence is generated using control circuitry. A preamble for a packet is generated using the control circuitry. The preamble includes a training field symbol which includes the training field sequence. A portion of the training field sequence is within a plurality of guard tones of the training field symbol. The preamble is transmitted using transmit circuitry.

Accordingly, the method allows decoding of packets at different signal bandwidths, for example packets supporting the 802.11ah standard. By including a portion of the training field sequence within guard tones of the training field symbol, channel estimations for the relevant tones in a wireless packet may be generated, allowing a receiver to decode the wireless packet properly.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIG. 6 shows an example of a long training field sequence for different signal bandwidths according to an embodiment of the present disclosure.

DETAILED DESCRIPTION

To provide an overall understanding of the disclosure, certain illustrative embodiments will now be described. However, the systems and methods described herein may be adapted and modified as is appropriate for the application being addressed and that the systems and methods described herein may be employed in other suitable applications, and that such other additions and modifications will not depart from the scope hereof.

Figure 1:
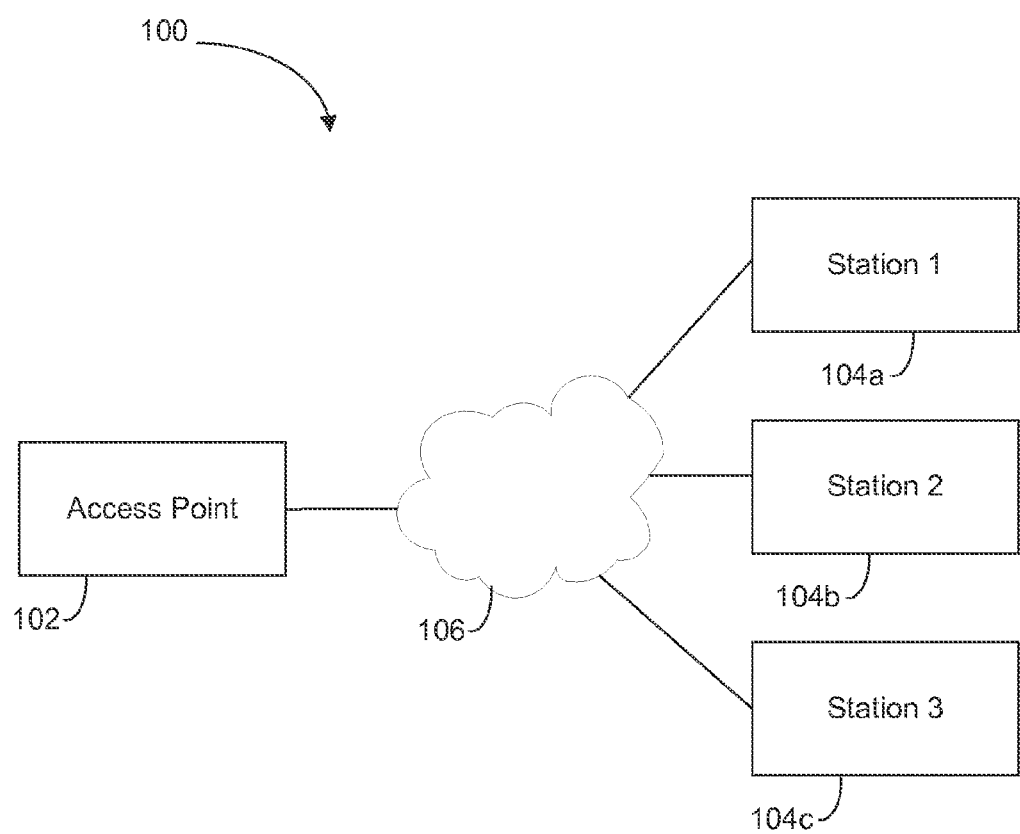
FIG. 1 shows an example of a wireless communications system according to an embodiment of the present disclosure.

FIG. 1 shows an example of a wireless communications system 100. Wireless communications system 100 may include a plurality of client devices that are interconnected to form a wireless network. For example, wireless communications system 100 may include access point station (AP) 102. AP 102 may be configured to communicate with wireless stations 104a-c via wireless signals over a network 106.

Wireless stations 104a-c may be any suitable type of wireless device compatible with the wireless network standard of wireless communications system 100. For example, wireless stations 104a-c may operate based on a protocol or communications standard compatible with base station 102. In some embodiments, the wireless network 106 may use the 802.11ah wireless standard protocol. The 802.11ah wireless protocol may define, for example, various wireless signal properties that allow wireless communication to occur reliably over network 106.

AP 102 may send a message or packet via the network to one or multiple wireless stations 104a-c. The packet may be in a format defined by the transmission protocol employed by the wireless network, such as the 802.11ah protocol. Encoded within the packet may be preamble symbols which provide channel estimation information and signaling information to wireless stations 104a-c. Signaling information includes parameters which wireless stations 104a-c may use to decode the data sent within the packet. For example, the signal information may include the signal bandwidth parameter, the encoding configuration of the packet, identification information, and modulation information. Other signaling information may be provided which are defined within the 802.11ah wireless standard. To decode and process the packet, wireless stations 104*a-c* process and decode the preamble symbols. As will be described in greater detail below, AP 102 may include control circuitry to generate preambles symbols sent within the packet. Wireless stations 104*a-c* may include control circuitry to interpret the preamble symbols of the packet received from AP 102. In particular, wireless stations 104*a-c* may apply the complementary techniques used by AP 102 to process and decode the preamble symbols within the packet. In some embodiments, wireless stations 104*a-c* may send packets including preamble symbols similar to that of AP 102 to AP 102 using a similar technique.

Figure 2:
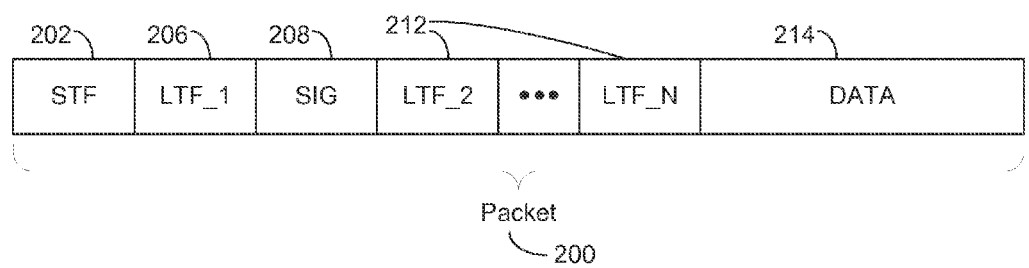
FIG. 2 shows an example of an 802.11ah packet format according to an embodiment of the present disclosure.

FIG. 2 shows an example of an 802.11ah packet format 200. As shown, various symbols, also known as fields are sent within an 802.11ah packet. These fields include short training field (STF) 202, signaling field (SIG) 206, long training fields (LTF) 208 and 212, and the data field 214.

STF 202 symbols are generated by AP 102 and provide synchronization information to wireless stations 104*a-c* which receive the packet. Synchronization information provides the wireless stations 104*a-c* with information for syncing a wireless station with AP 102 and other wireless stations 104*a-c*. LTF 208 symbols are generated by AP 102 and provide channel estimation information to wireless stations 104*a-c* which receive the packet. Channel estimation information provides the wireless stations 104*a-c* with characteristics of network 106, allowing wireless stations 104*a-c* to properly decode the packet. For example, wireless stations 104*a-c* may use the determined channel estimation information to demodulate and decode the received packet sent by AP 102.

SIG symbol 206 is also generated by AP 102 and provides configuration parameters of the packet sent by AP 102. These configuration parameters are defined by the 802.11ah standard and include information such as the type of modulation used, the error correction encoding used, the signal bandwidth, and the number of streams allocated to wireless stations 104*a-c*. Other parameters may be included which are defined within the 802.11ah standard. After the SIG symbol 206 is processed and decoded by wireless stations 104*a-c*, the packet sent by AP 102 may be decoded by wireless stations 104*a-c*.

In order to decode SIG symbol 206 information, wireless stations 104*a-c* uses the channel estimation information determined from LTF symbols 208. For example, wireless stations 104*a-c* decode subcarriers or tones within LTF symbol 208 and determine the channel characteristic on each tone occupied by the LTF symbol. Each tone decoded within the LTF symbol 208 may correspond to a tone within the SIG symbol 206. Using the channel estimation information determined from the LTF symbol 208 for a specific tone, a corresponding tone within the SIG symbol 206 may be decoded. If the LTF does not provide channel estimation information for a corresponding tone within the SIG symbol 206, the SIG symbol 206 may not be properly decoded, and the packet itself will not be decoded properly, since information required for decoding the packet is contained within the SIG symbol 206.

Figure 3:
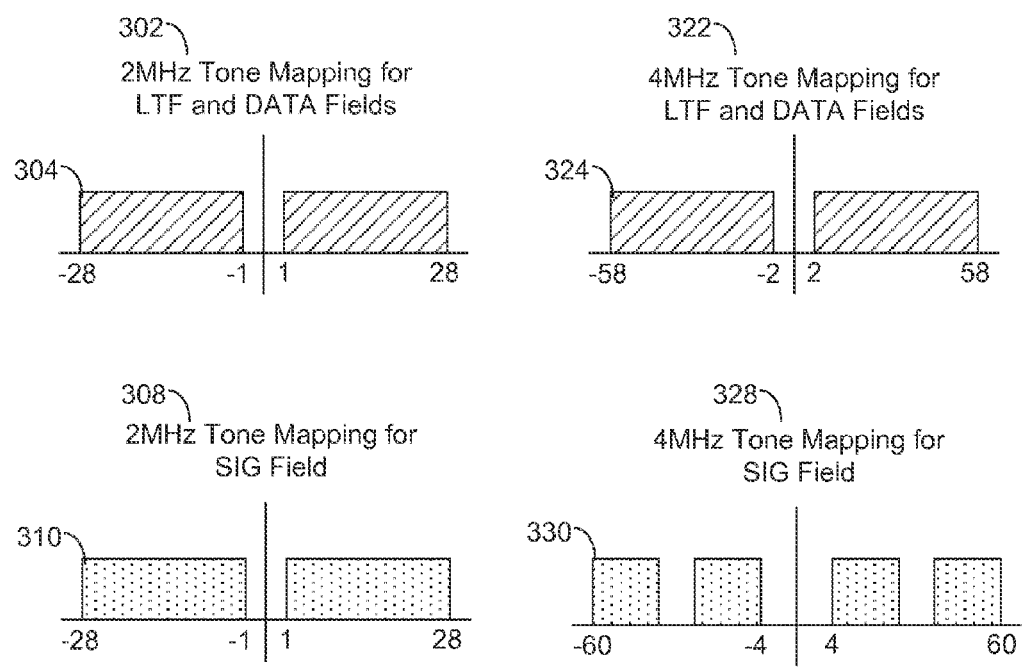
FIG. 3 shows an illustrative representation of tone mappings for preamble fields within an 802.11ah packet according to an embodiment of the present disclosure.

FIG. 3 shows an illustrative representation of tone mappings for preamble fields within an 802.11ah packet. Shown in FIG. 3 are tone mappings for two supported signals bandwidths for the 802.11ah protocol: 2 MHz and 4 MHz. The 802.11ah protocol supports many other signal bandwidths, such as 8 MHz and 16 MHz, and the two are just shown as an example.

The tone mapping 302 of the LTF symbol is shown in FIG. 3 for the 2 MHz signal bandwidth. The LTF symbol tones 304 span from tones −28 to −1 and 1 to 28. These LTF symbol tones allow for proper decoding of the SIG and DATA symbols within the packet at corresponding tone locations in each. For example, the tone mapping 308 of the SIG symbol for the 2 MHz signal bandwidth is also shown. The tones in SIG symbols also span tones −28 to −1 and 1 to 28. Since channel estimation information may be determined for these tones, the corresponding tones in the SIG and DATA symbols may be properly decoded using the channel estimation information from the tones in the LTF symbol.

As proposed in the 802.11ah protocol, wireless stations 104 operating at signal bandwidths greater than a baseline signal bandwidth should at least be able to process and decode the SIG symbol 206 at the baseline signal bandwidth in the control channel. For example, wireless stations 104*a-c* operating at either a 4 MHz, 8 MHz, or 16 MHz signal bandwidth should be able to decode the 2 MHz SIG symbol in the control channel. As another example, wireless stations 104*a-c* operating at either a 2 MHz, 4 MHz, 8 MHz, or 16 MHz signal bandwidth should be able to decode the 1 MHz SIG symbol in the control channel. Because of this requirement, the SIG symbol for higher signal bandwidths, such as 4 MHz, 8 MHz, and 16 MHz, may be generated by repeating and phase rotating instances of the 2 MHz signal bandwidth SIG symbol over each 2 MHz sub-band of the higher signal bandwidths.

The repetition of the 2 MHZ SIG symbol across the higher signal bandwidths may cause decoding issues. Based on the repetition of the 2 MHz SIG symbol, the SIG symbol of higher signal bandwidths contain tones outside of the tones of the LTF symbol for the higher signal bandwidths. Because the SIG symbol and the LTF symbol require corresponding tones for proper decoding and processing of the SIG symbol, the SIG symbol tones outside of the tones of the LTF symbol may not have channel estimation information, and will not be decoded correctly. For example, the LTF symbol tone mapping 322 for the 4 MHz bandwidth signal allows for channel estimation tones 324 to be determined for tones −58 to −2 and 2 to 58. However, as seen in the SIG symbol tone mapping 328 for the 4 MHz bandwidth signal, the SIG symbol tones 330 extend to tones −60, −59, 59, and 60. These extended tones have no corresponding tone in the LTF symbol, which prevents wireless stations 104*a-c* from estimating the channel on these tones, a result of which the SIG symbol cannot be properly decoded. These extended tones may be present in signal bandwidths greater than 2 MHz. Therefore, a wireless station operating at a 4 MHz, 8 MHz, or 16 MHz signal bandwidth may not be able to decode the SIG symbol within the packet based on an implementation of the 802.11ah protocol.

Figure 4:
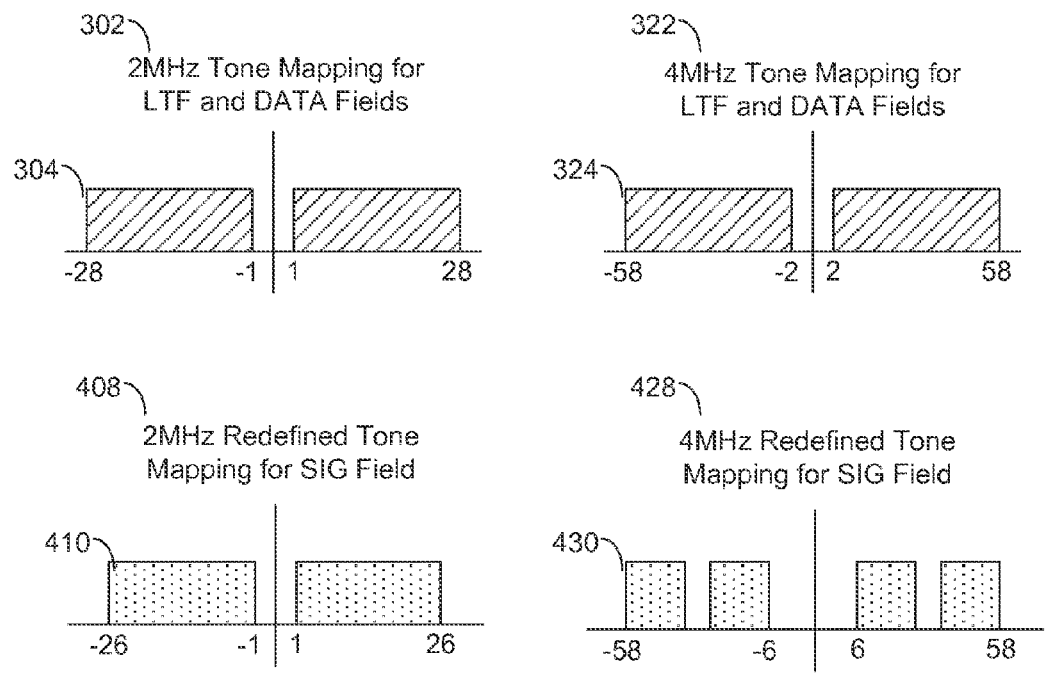
FIG. 4 shows an illustrative representation of redefined tone mappings for preamble fields within an 802.11ah packet according to an embodiment of the present disclosure.

FIG. 4 shows an illustrative representation of redefined tone mappings for preamble fields within an 802.11ah packet. In some embodiments, the SIG symbol decoding problem may be addressed by redefining the SIG symbol field. By reducing the number of SIG field information bits, the number of tones which the SIG symbol spans can also be reduced. For example, tone mapping 302 for LTF symbol tones 304 at the 2 MHz bandwidth is kept to span tones −28 to −1 and 1 to 28, the same as described in FIG. 3. However, tone mapping 408 for the SIG symbol at 2 MHZ signal bandwidth is redefined to span SIG tones 410 from tones −26 to −1 and 1 to 26. Reducing the number of tones 310 in the SIG symbol 408 for the 2 MHz signal bandwidth may not effect the decoding of the SIG symbol because the SIG symbol still has corresponding tones in the LTF symbol. This technique requires only changes to the SIG symbol and not to the LTF symbol.

For signal bandwidths greater than 2 MHz, the 2 MHz SIG symbol 408 is repeated and phase rotated over each 2 MHz sub-band of the signal bandwidth. Because the number of tones used in SIG symbol 408 for the 2 MHz signal bandwidth is reduced, the SIG symbol tones in signal bandwidths greater than 2 MHz are bounded by the tone mapping for the LTF symbol, allowing for correct decoding of the SIG symbol at signal bandwidths greater than 2 MHz. For example, tone mapping 428 for the SIG symbol 430, at a signal bandwidth of 4 MHz, extends only up to tones −58 and 58. The SIG symbol tones 430 are have corresponding tones in the tone mapping 322 for LTF symbol 324. Therefore the problem of SIG symbol tones, such as SIG symbol tones 330, extending past LTF symbol tones 324 does not occur, and channel estimation information may be determined for each SIG tone 430 in the SIG symbol.

In some embodiments, the SIG field bits corresponding to the reserve bits and identification information, such as the Partial Association Identification (PAID) may be selected as the bits to reduce. PAID bits are used to determine which wireless station is the recipient of the sent packet. Other field bits contained within the SIG symbol according to the 802.11ah standard may be reduced in order to reduce the number of SIG field bits.

Figure 5:
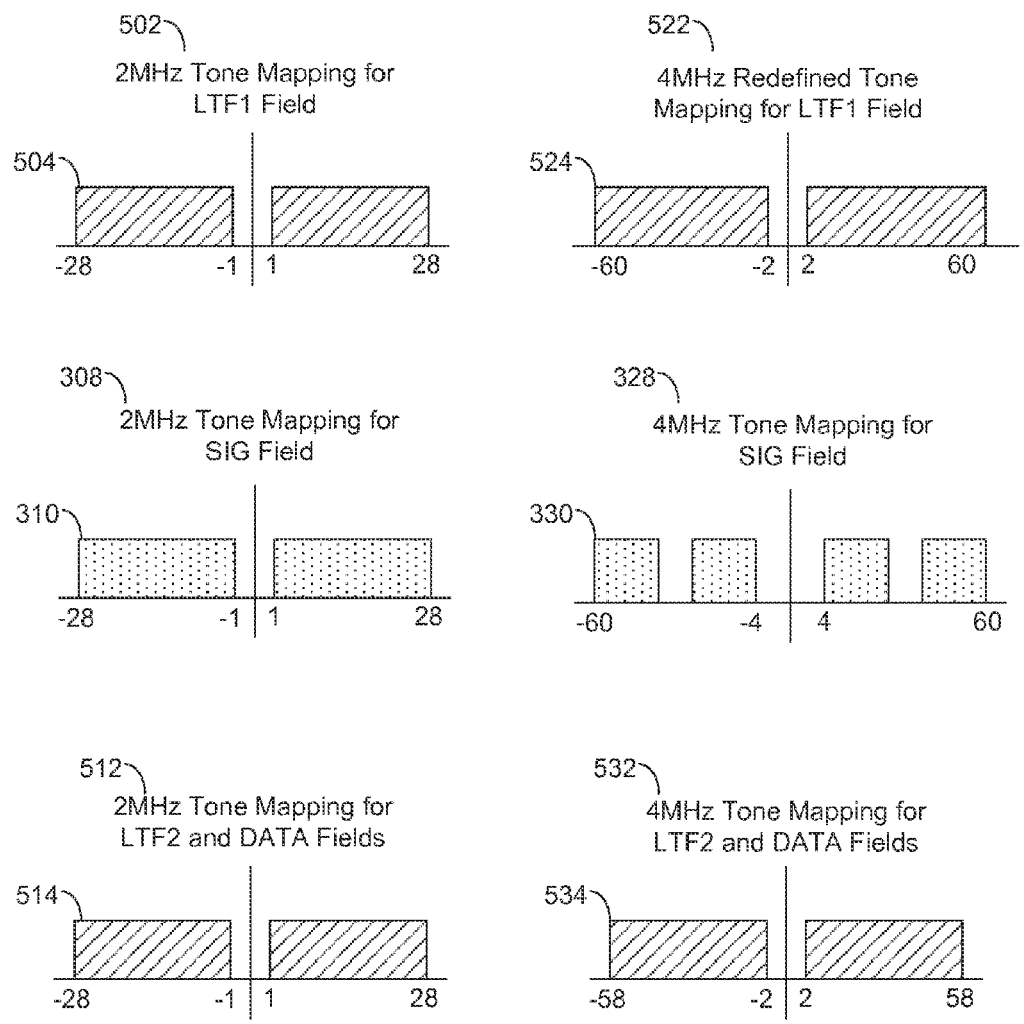
FIG. 5 shows an illustrative representation of redefined tone mappings for the long training field within an 802.11ah packet according to an embodiment of the present disclosure.

FIG. 5 shows an illustrative representation of redefined tone mappings for the LTF symbol within an 802.11ah packet. In some embodiments, the SIG symbol decoding problem may be addressed by redefining the first LTF symbol 522 that is sent in the preamble of an 802.11ah packet 200. For example, the number of tones 524 for the first LTF symbol 522 may be increased to add additional tones on both edges of the symbol. By increasing the number of tones in the first LTF symbol 522, the SIG symbol 328 does not have to be changed and may be decoded correctly. Each tone 330 in the SIG symbol 328 may have a corresponding tone 524 in the LTF symbol 522, and channel estimation information may be determined for each tone 330 in the SIG symbol 328, allowing the SIG symbol 328 to be decoded correctly. Since only the first LTF symbol 522 is required to decode the SIG symbol 328, subsequent LTFs 532 within the packet may still maintain the previous tone mappings 534 (e.g. LTF_2-LTF_N).

The additional number of tones in the first LTF symbol 522 may cause a power difference compared to subsequent LTF symbols 532 within the packet. The power difference needs to be resolved between the LTFs in order for properly determine channel estimation information required to decode the DATA symbols 214 within the packet.

In some embodiments, the same time domain power may be maintained across all LTF symbols within a packet. In this case, each LTF is transmitted with the same total transmit power distributed across all the tones in each LTF. As a result, the tones in the first LTF 206 will have a lower power per tone compared to that in subsequent LTFs 212 because the first LTF 206 has an additional number of tones in order to decode the SIG symbol 208. In order to compensate for the lower power per tone in the first LTF symbol 206, compensation circuitry within wireless stations 104a-c may be configured to scale the tones of the first LTF symbol 206 by a predetermined amount to match the power per tone of the subsequent LTFs 212. The predetermined amount of scaling that is done on the tones 524 of the first LTF symbol 206 may be based on the signal bandwidth which the packet was sent in.

In some embodiments, the same frequency domain power per tone may be maintained across all LTF symbols within a packet. In this case, the tones of the first LTF symbol are scaled up to have the same power per tone as the subsequent LTF symbols. AP 102 may include transmit compensation circuitry configured to determine the amount of power each tone within the first LTF symbol needs to be scaled up by in order to match the same power per tone as the subsequent LTFs within the packet. Then the transmit compensation circuitry may scale up the tones of the first LTF symbol by the determined power scale value and ensure that each tone has the same power per tone throughout all the LTF symbols within the packet.

In some embodiments, the tone mappings in subsequent LTFs within the same packet may also include the additional tones similar to that of the first LTF symbol. This would make the power per tone the same for all the LTF symbols within a packet and require no further scaling to be performed during transmission from an AP 102 or during decoding at wireless stations 104a-c.

FIG. 6 shows an example of LTF sequences for different signal bandwidths. As discussed before, for signal bandwidths greater than 2 MHz, the 2 MHz SIG symbol 408 is repeated and phase rotated over each 2 MHz sub-band of the signal bandwidth. Since the 2 MHz SIG symbol is repeated across multiple sub-bands, a single LTF sequence may be used, rather than a different LTF sequence for each signal bandwidth. In some embodiments, the LTF symbol at signal bandwidths greater than 2 MHz may be composed of repetitions of the LTF symbol at 2 MHz.

In certain cases, tones within the DATA symbols may not have corresponding tones in the LTF symbol composed of repetitions of the 2 MHz LTF. By filling the LTF symbol with predetermined tone values at these locations, all the tones in the DATA symbols will have corresponding tones in the LTF symbol. Channel estimation information may be determined from the LTF symbol and the DATA symbol may be processed correctly.

As shown in FIG. 6, two example LTF sequences, $LTF_{left}$ 602 and $LTF_{right}$ 604, are used to generate the LTF symbols for each signal bandwidth. The LTF symbol sequence 606 for 2 MHz is shown, which is based on the LTF sequences in the 802.11ac protocol.

However, based on the 802.11ac protocol, the LTF symbol sequence 608 for 4 MHz is not composed of repetitions of the LFT symbol at 2 MHz. Instead only a portion 607 of the LTF symbol at 2 MHz is repeated across the LTF symbol 608 at 4 MHz. This means that the different LTF sequences are required to support the 2 MHz signal bandwidth and signal bandwidths greater than 2 MHz.

In order to use one LTF sequence across all signal bandwidths, a new LTF sequence should be used. Instead of using portion 607 of the LTF symbol at 2 MHz, the LTF symbol 610 at 4 MHz may be composed of repetitions of the LTF symbol 606 at 2 MHz. The location that the 2 MHz LTF sequence is positioned in the LTF Symbol at 4 MHz allows the SIG symbols to use the exact same LTF symbol for decoding. This allows a single LTF symbol sequence to be used across all the signal bandwidths. The tones in the LTF symbol in between the repetitions of the 2 MHz LTF Sequence may be filled with any arbitrary permutation of 1 and −1. Similarly, LTF symbols for signal bandwidths greater than 4 MHz may be composed in a similar fashion at the LTF symbol at 4 MHz.

Figure 7:
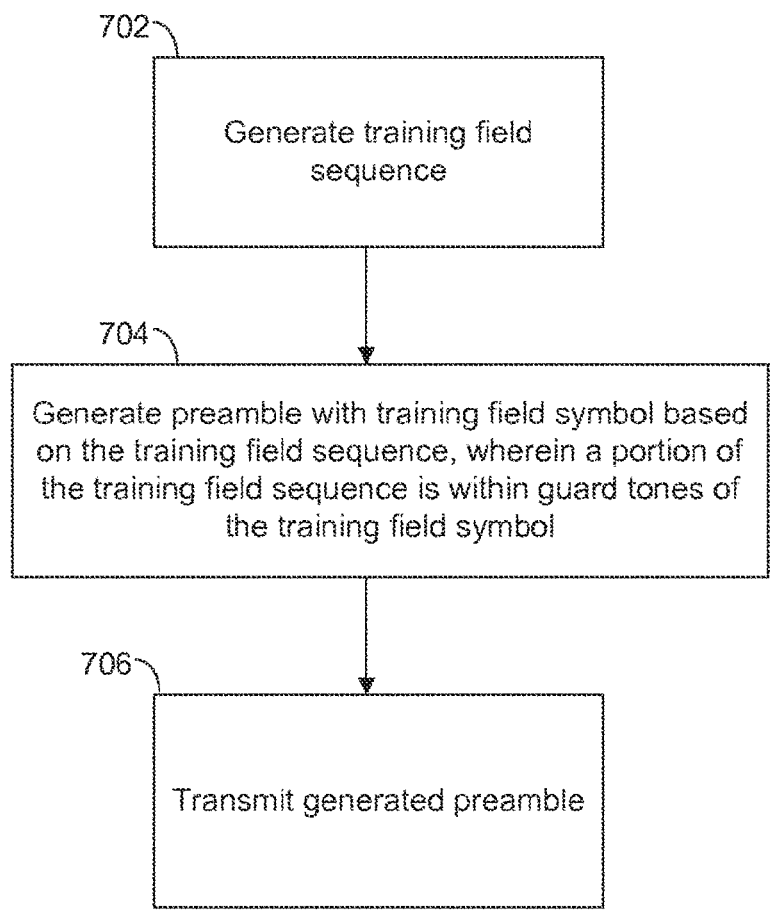
FIG. 7 shows an illustrative process for generating a preamble according to an embodiment of the present disclosure.

FIG. 7 shows an illustrative process for generating a preamble. At 702, a LTF sequence is generated by control circuitry. The LTF sequence is based on the signal bandwidth which the packet is being sent over. At 704, the preamble is generated which includes a LTF symbol. The LTF symbol is based on the generated LTF sequence. Depending on what signal bandwidth is used, the LTF symbol may be generated based on repetitions of the LTF sequence. These repetitions may also be phase rotated within the LTF symbol. For example, a 4 MHz LTF symbol may be generated based on repetitions of a baseline bandwidth LTF symbol, such as the 2 MHz LTF symbol.

In some embodiments, the portions of the LTF sequence are positioned within the guard tones of the LTF symbol. Guard tones are the tones at the edge of the LTF symbol which are reserved for adjacent channel separation. Guard tones are generated by sending values of zero at a tone location. By setting a non-zero value at guard tone locations, channel estimation information may be determined for those tone locations which may aid in decoding the SIG symbol. By extending the LTF sequence into the guard symbol, channel estimation information may be determined for the tones within the guard tones.

In some embodiments, the LTF sequence values within the guard tones are selected as non-zero values, such as values of 1 and −1. In some embodiments, the LTF sequence may extend into guard tones on both ends of the LTF symbol.

At 706, the preamble is transmitted within a wireless packet from the AP 102 to wireless stations 104a-c using transmit circuitry. Transmit circuitry may scale the power of each tone sent within the LTF symbol. Since, additional tones are added to the LTF symbol, which are positioned in the guard tones, the power per tone decreases. Since the total transmit power may be fixed, the power per tone decreases as more tones are added. In order to compensate for this decrease, the transmit circuitry may determine a scaling factor based on the power per tone of another LTF symbol which does not have tones within its guard tones. The transmit circuitry may then apply this scaling factor to the tones of the LTF symbol.

The foregoing is merely illustrative of the principles of this disclosure and various modifications can be made without departing from the scope of the present disclosure. For example, although control circuitry and transmit circuitry are described with respect to an AP 102, wireless stations 104a-c may be configured to receive the preamble generated by AP 102. The LTF symbol 206 within the preamble sent by the AP 102 may be configured to decode LTF and SIG symbols generated in a manner as disclosed in the present disclosure.

Moreover, further aspects of the present disclosure relate to one or more of the following clauses. In an aspect of the present disclosure, a method for transmitting an 802.11ah packet may be provided. The method may include generating a training field sequence, and generating a preamble for a packet using control circuitry. The preamble includes a training field symbol, which includes the training field sequence. A portion of the training field sequence may be within a plurality of guard tones of the training field symbol. The preamble may be transmitted using transmit circuitry.

In some implementations, a portion of the training field sequence within the plurality of guard tones of the training field symbol may be non-zero. In some implementations, a portion of the training field sequence within the plurality of guard tones of the training field symbol may be at both ends of the training field sequence within guard tones at both ends of the training field symbol. In some implementations, the training field sequence is based on repetitions of a training field sequence substationally similar to that of a baseline bandwidth. The training field sequence of the baseline bandwidth may include a bit sequence of $\{1, 1, \text{LTF}_{left}, 0, \text{LTF}_{right}, -1, -1\}$, wherein $\text{LTF}_{left}$ and $\text{LTF}_{right}$ are predetermined training field bit sequences. The baseline bandwidth may be 2 MHz. Generating the preamble for the packet may include generating the preamble for a bandwidth greater than the baseline bandwidth. In some implementations, the training field symbol may be a first training field symbol, and transmitting the preamble includes transmitting the first training field symbol with the same frequency domain power per tone as a second training field symbol. The first and second training field symbol may be within the same packet. The second training field symbol may include a training field sequence bounded by guard tones of the second training field symbol.

In another aspect of the present disclosure, a system for transmitting an 802.11ah packet may be provided. The system may include preamble circuitry configured to generate a training field sequence, generate a preamble for a packet. The preamble includes a training field symbol, which includes the training field sequence. A portion of the training field sequence is within a plurality of guard tones of the training field symbol. The preamble is provided for transmission.

In some implementations, a portion of the training field sequence within the plurality of guard tones of the training field symbol may be non-zero. In some implementations, a portion of the training field sequence within the plurality of guard tones of the training field symbol may be at both ends of the training field sequence within guard tones at both ends of the training field symbol. In some implementations, the training field sequence is based on repetitions of a training field sequence substationally similar to that of a baseline bandwidth. The training field sequence of the baseline bandwidth may include a bit sequence of $\{1, 1, \text{LTF}_{left}, 0, \text{LTF}_{right}, -1, -1\}$, wherein $\text{LTF}_{left}$ and $\text{LTF}_{right}$ are predetermined training field bit sequences. The baseline bandwidth may be 2 MHz. The preamble circuitry may be configured to generate the preamble for a bandwidth greater than the baseline bandwidth. In some implementations, the training field symbol may be a first training field symbol, and the system includes transmit circuitry configured to transmit the first training field symbol with the same frequency domain power per tone as a second training field symbol. The first and second training field symbol may be within the same packet. The second training field symbol may include a training field sequence bounded by guard tones of the second training field symbol.

The above described embodiments of the present disclosure are presented for purposes of illustration and not of limitation, and the present disclosure is limited only by the claims which follow.

What is claimed is:

1. A method for transmitting a wireless packet, the method comprising:
   generating, using control circuitry, a training field sequence;
   generating, using the control circuitry, a preamble for a packet, wherein the preamble comprises a first training field symbol, wherein the first training field symbol comprises the training field sequence, wherein respective portions of the training field sequence are located at respective guard tone locations at both ends of the first training field symbol; and transmitting, using transmit circuitry, the preamble, wherein the transmitting comprises transmitting tones of the first training field symbol with the same frequency domain power per tone as tones of a second training field symbol.

2. The method of claim 1, wherein the portion of the training field sequence located at the guard tone location of the first training field symbol is non-zero.

3. The method of claim 1, wherein the training field sequence is based on repetitions of a training field sequence substantially similar to that of a baseline bandwidth.

4. The method of claim 3, wherein the training field sequence of the baseline bandwidth comprises a bit sequence of $\{1, 1, \text{LTF}_{left}, 0, \text{LTF}_{right}, -1, -1\}$, wherein $\text{LTF}_{left}$ and $\text{LTF}_{right}$ are predetermined training field bit sequences.

5. The method of claim 3, wherein the baseline bandwidth is 2 MHz.

6. The method of claim 3, wherein generating the preamble for the packet comprises generating the preamble for a bandwidth greater than baseline bandwidth.

7. The method of claim 1, wherein the first and second training field symbols are within the packet.

8. The method of claim 1, wherein the second training field symbol comprises a second training field sequence bounded by guard tones of the second training field symbol.

9. A system for transmitting a wireless packet, the system comprising:
preamble circuitry configured to
(i) generate a training field sequence,
(ii) generate a preamble for a packet, wherein the preamble comprises a first training field symbol, wherein the first training field symbol comprises the training field sequence, wherein respective portions of the training field sequence are located at respective guard tone locations at both ends of the first training field symbol, and
(iii) provide the preamble for transmission, wherein the system comprises transmit circuitry configured to transmit tones of the first training field symbol with the same frequency domain power per tone as tones of a second training field symbol.

10. The system of claim 9, wherein the portion of the training field sequence located at the guard tone location of the first training field symbol is non-zero.

11. The system of claim 9, wherein the training field sequence is based on substantially similar repetitions of a training field sequence of a baseline bandwidth.

12. The system of claim 11, wherein the training field sequence of the baseline bandwidth comprises a bit sequence of $\{1, 1, \text{LTF}_{left}, 0, \text{LTF}_{right}, -1, -1\}$, wherein $\text{LTF}_{left}$ and $\text{LTF}_{right}$ are predetermined training field bit sequences.

13. The system of claim 11, wherein the baseline bandwidth is 2 MHz.

14. The system of claim 11, wherein the preamble circuitry is configured to generate the preamble for a bandwidth greater than the baseline bandwidth.

15. The system of claim 9, wherein the first and second training field symbols are within the packet.

16. The system of claim 9, wherein the second training field symbol comprises a second training field sequence bounded by guard tones of the second training field symbol.

* * * * *